United States Patent Office 3,773,736
Patented Nov. 20, 1973

3,773,736
WATER SOLUBLE CATIONIC THERMOSETTING POLY(N-CARBAMOYL)POLYALKYLENEPOLY-AMINE AND WET STRENGTH PAPER CONTAINING THE SAME
Laurence Lyman Williams, Stamford, and Anthony Thomas Coscia, Norwalk, Conn., assignors to American Cyanamid Company, Stamford, Conn.
No Drawing. Continuation-in-part of applications Ser. No. 471,463, July 12, 1965, now abandoned, and Ser. No. 745,486, July 17, 1968, now Patent No. 3,556,932. This application Jan. 18, 1971, Ser. No. 107,405
Int. Cl. C08g 9/08
U.S. Cl. 260—68     5 Claims

ABSTRACT OF THE DISCLOSURE

A water-soluble polyalkylenepolyamine is provided with carbamoyl substituents by reaction with a cyanate or with urea, and then reacted with glyoxal. The resulting polymer is water-soluble cationic and thermosetting and produces paper of good initial wet strength but which loses much of its wet strength rapidly on normal weathering.

---

This is a continuation-in-part of our copending application Ser. No. 471,463, filed July 12, 1965, now abandoned and our copending application Ser. No. 745,486, filed July 17, 1968, now U.S. Pat. No. 3,556,932.

The present invention relates to a new water-soluble thermosetting water-soluble ionic polymer carrying amide and glyoxalated amide substituents, wet strength paper having a content of said polymer, and the processes involved in the manufacture of the polymer and the paper.

Our parent application discloses that the water-soluble ionic polymers which consist essentially of linear vinyl "backbone" chains carrying glyoxalated amide substituents are valuable agents for use in the manufacture of paper. The application discloses that when water-laid webs of cellulose fibers which have an adsorbed content of said polymers are dried at normal temperatures in the range of 190°–250° F., the polymer molecules react with the cellulose and that in addition the polymer molecules cross-link among themselves, so that the resulting paper possesses excellent wet strength.

An important property of the polymer and of the wet strength paper is that about half of the wet strength which the polymer imparts and which the paper possesses is temporary and disappears when the paper is soaked in water for 24 hours at room temperature.

Permanent wet strength is unnecessary and indeed is often an undesirable property in paper. The time during which wet strength is needed in the case of paper towels, napkins and "personal" tissues (once they have been used) is rarely more than a few minutes, and a substantial part of the national litter problem results from the fact that discarded paper of these types remains intact for a long period of time when discarded out of doors. Moreover, broke which possesses permanent wet strength is difficult to rework; cf. U.S. Pat. Nos. 2,394,273; 2,423,097 and 2,872,313.

There is, therefore, a demand for high wet strength paper which retains its wet strength during brief contact with moisture but which loses much of its strength after a short period of natural weathering. Our parent application provides paper of this character.

The present invention provides a new polymer which possesses substantially the same properties as the polymer of our parent application and which provides paper of similar wet strength properties.

About half of the wet strength disappears after the paper has been soaked in water for 24 hours at room temperature. Articles composed of the paper of the present invention, when discarded are quickly reduced to discrete fibrous state and do little harm to the ecology.

The polymer of the present invention is a water-soluble cationic poly(N-carbamoyl)polyalkylenepolyamine which carries a sufficient number of glyoxal (—CHOHCHO) substituents so that it is thermosetting. It thus conains the characterizing theoretical linkage:

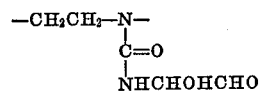

A variety of water-soluble cationic poly(N-carbamoyl) polyalkylenepolyamines are known, and any of these is suitable as the first component of the polymer. Thus, the poly(N-carbamoyl)polyalkylenepolyamine may be polyethyleneimine which has been reacted with urea; the polymer is substantially composed of

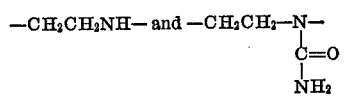

linkages. Alternatively, the polymer may contain trimethylene linkages such as are provided when the condensation product of 3,3′-iminobispropylamine is reacted with ethylene dichloride and then with urea.

Moreover, the polyamine may contain amide linkages as occurs when adipic acid is reacted with diethylenetriamine or tetraethylenepentamine in 1:1 molar ratio and the resulting polyamidepolyamine is reacted with urea.

Such amide-containing polymers can contain arylene rings, as occurs when ¾ mol of adipic acid is condensed with the condensation product of ¼ mol of isophthalic acid with 1 mol of diethylenetriamine, as is disclosed and claimed in our copending application Ser. No. 80,181, filed on Oct. 12, 1970, and the resulting polymer is reacted with urea.

The carbamoyl substitutents which are present in the polymer of the present invention may be attached by reacting the parent polyalkylenepolyamine with urea, for example, as disclosed in Yost et al. U.S. Pat. No. 2,616,-874 or with potassium cyanate as disclosed in U.S. Pat. No. 2,885,318. The cyanate method is preferred as in the urea method, a part of the urea acts as crosslinking agent. The polymer, therefore, tends to contain fewer sites with which glyoxal can react and is somewhat less storage-stable. The carbamoyl substituents are the primary, i.e., principal sites with which the glyoxal reacts, and therefore, the number of carbamoyl substituents should be at least equal to the number of glyoxal substituents needed to render the polymer thermosetting. This is about 0.05 substituent per polymer linkage.

A larger number of carbamoyl substituents gives better results and we prefer that the number of these substituents be between 75% and 95% of the total number of linkages of which the polymer is composed. This range permits a sufficient number of cationic linkages to be present to render the polymer adequately cellulose-substantive, and yet permits a large majority of the linkages to carry substituents which produce a wet-strengthening action.

The polymers of the present invention are prepared by reacting a water-soluble cationic poly(N-carbamoyl)-polyalkyleneamine with sufficient glyoxal to produce a polymer which is thermosetting, i.e., one which converts to insoluble state when heated at 100° C. Our evidence is that about 0.05 mol of glyoxal per polymer linkage is about the minimum which is needed for the purpose. More than 1 mol may be added, up to about 2 mols. However, when working with our preferred polymers (which contain 75 to 95 mol percent of carbamoyl substituents per amino linkage of which the polymer is composed) we prefer to add about 0.5 to 1 mol of glyoxal per mol of carbamoyl substituents present. Since only about half of the added glyoxal reacts, the number of mols of glyoxal present in the polymer is between about ⅓ and ½ of the total number of linkages present. This amount is particularly advantageous because when the wet web is dried the glyoxal substituents react with unglyoxalated substituents in addition to reacting with the cellulose of which the fibers are composed, and thereby produce a cross-linking action which provides additional wet strength.

The polymers are used in the manufacture of paper in the same manner as the polymers of our parent application. They are added preferably as a dilute aqueous solution to a dilute suspension of beaten cellulose papermaking fibers at any pH within the range of about 4 to 8.

Most rapid cure of the polymer occurs in the range of about 4–6. However, pH within the range of 6 to 8 works well and is preferred because in this range the polymer thermosets or "cures" with adequate rapidity, yet the resulting paper is alkaline or nearly so, and corrosion of the machine is held to a minimum.

Thereafter, the suspension is formed into a web which is dried in customary manner on drying rolls having a surface temperature of 190° F. to 250° F. The wet-strengthening properties of the polymer develop as the web is dried. About the same wet strength results, however, when the web is dried at room temperature.

The paper of the present invention possesses very satisfactory wet strength. It is an important property of this paper that it loses about half its wet strengh when soaked in water at a pH of 9 or higher at room and especially at elevated temperature.

The invention is more particularly described by the examples which follow. These examples are best embodiments of the invention and are not to be construed in limitation thereof.

EXAMPLE 1

The following illustrates the preparation of a water-soluble cationic thermosetting glyoxalated poly(N-carbamoyl)polyalkylenepolyamine.

An aqueous solution of poly(N-carbamoyl)polyethyleneimine (prepared by reacting 1 mol of polyethyleneimine with 1 mol of potassium cyanate according to U.S. Pat. No. 2,885,318) is cooled to room temperature, and the precipitated potassium chloride is separated by filtration.

To a part of the filtrate is added sufficient of a 40% by weight solution of glyoxal in water to provide 0.75 mol of glyoxal per carbamoyl substituent present. The pH is adjusted to 8 and the solution is heated at 50° C. until the solution has noticeably increased in viscosity but is short of the gel point. The reaction mixture is then diluted to 10% solids, cooled to room temperature and acidified to pH 4.

The product comprises linkages having the theoretical formula:

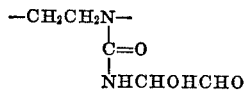

and is water-soluble, cationic and thermosetting.

EXAMPLE 2

The foregoing procedure is repeated except that the starting material is the reaction product of potassium cyanate with the polyalkylenepolyamine prepared by reacting 3,3'-iminobispropylamine with ethylene dichloride as shown in said U.S. Pat. No. 2,885,318.

Substantially the same product is obtained.

EXAMPLE 3

The following illustrates the preparation of a water-soluble cationic thermosetting glyoxylated poly(N-carbamoyl)polyamidopolyalkylenepolyamine.

To 53.3 g. (0.25 mol) of a water-soluble linear polymer prepared by condensing 1 mol of adipic acid with 1 mol of diethylenetriamine as a melt at 130° C., is added 30 g. (0.5 mol) of urea. The melt is stirred at 150° C. until evolution of ammonia falls to a low rate. A portion of the urea remains unreacted. The product is water-soluble and cationic.

To a solution of 15 g. of the product in 80 cc. of water at pH 8 is added 15 g. of a 40% by weight solution of glyoxal in water. When the solution exhibits a substantial increase in viscosity but is short of the gel point, it is diluted to 10% solids by addition of water, acidified to pH 3 and cooled to room temperature.

It is in part composed of linkages having the theoretical formula:

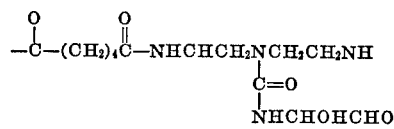

EXAMPLE 4

The following illustrates the preparation of a different water-soluble cationic thermosetting glyoxalated poly(N-carbamoyl)polyamidopolyalkylenepolyamine.

To 39.9 g. (0.075 mol) of the water-soluble polyamidopolyamidepolyamine (made by condensing 1 mol of isophthalic acid, 1 mol of adipic acid with 2 mols of triethylenetetramine according to the method of copending Williams et al. U.S. application Ser. No. 80,181, filed on Oct. 12, 1970) as a melt at 130° C. is added 18.0 g. (0.3 mol) of urea. The melt is stirred at 150° C. until evolution of ammonia falls to a low rate (about 50 minutes).

To 15 g. of the product dissolved in a 1:1 by volume water:acetone solution at pH 8.3 at room temperature is added 12.2 g. of a 40% by weight solution of glyoxal in water. When the solution exhibits a substantial increase in viscosity but is short of the gel point, it is diluted to 10% solids with more solvent, and acidified to pH 3.

It comprises linkages having the theoretical formula:

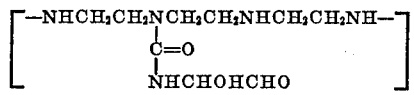

EXAMPLE 5

The following illustrates the manufacture of wet strength paper composed of cellulose papermaking fibers bonded together by an adsorbed content of a polymer according to the present invention in thermoset and cellulose-reacted state.

To an aqueous suspension of well-beaten cellulose papermaking fibers (commercially known as "Celate B") at a consistency of 0.6% and pH 6 is added sufficien of the polymer of Example 2 to provide 0.5% of the polymer on the dry weight of the fibers, after which the fibers are formed into a web at 50 lb. basis weight per 25" x 40"/500 ream, and the web is dried for 1 minute on a rotary drum drier having a drum temperature of 240° F. The procedure is repeated using twice the amount of polymer.

The resulting sheets have wet strengths respectively of 2.5 and 3.2 lb. per inch after 15 minutes in water at room temperature and pH 7.0 which becomes much less after the soak has been continued for 24 hours.

Similar paper is produced by use of the polymers of the remaining examples in the same manner.

We claim:
1. A water-soluble cationic poly(N-carbamayl) polyalkylenepolyamine carrying a sufficient number of —CHOHCHO substituents to be thermosetting.
2. A polymer according to claim 1 wherein the polyalkylenepolyamine is a poly(N-carbamayl)polyethyleneimine.
3. A polymer according to claim 1 wherein the polyalkylenepolyamine is a poly(N-carbamayl) polyamidepolyalkylenepolyamine.
4. A polymer according to claim 1 wherein the number of carbamayl substituents is between about 70 and 99 percent of the amino atoms in said polymer.
5. A polymer according to claim 1 wherein the number of —CHOHCHO substituents is between 10 and 50 percent of the carbamayl substituents in said polymer.

References Cited

UNITED STATES PATENTS

| | | | |
|---|---|---|---|
| 2,616,874 | 11/1952 | Yost et al. | 260—70 R |
| 2,764,507 | 9/1956 | Jen et al. | 260—72 R X |
| 3,329,657 | 7/1967 | Strazdins et al. | 260—72 X |
| 3,556,932 | 1/1971 | Coscia et al. | 260—72 X |

OTHER REFERENCES

Chem. Abstracts, vol. 67, 1967, 12758z, American Cynamid.

HOWARD E. SCHAIN, Primary Examiner

U.S. Cl. X.R.

162—166, 167; 260—29.4 R, 72 R

UNITED STATES PATENT OFFICE
CERTIFICATE OF CORRECTION

Patent No. 3,773,736          Dated   November 20, 1973

Inventor(s) LAURENCE LYMAN WILLIAMS and ANTHONY THOMAS COSCIA

It is certified that error appears in the above-identified patent and that said Letters Patent are hereby corrected as shown below:

Column 4 line 63.  "sufficien" should read -- sufficient --.
Column 5 lines 1, 6 and 8.  "(N-Carbamayl)" should read -- (N-carbamoyl) --; Column 5 lines 12 and 16.  "carbamayl" should read -- carbamoyl --.

Signed and sealed this 9th day of April 1974.

(SEAL)
Attest:

EDWARD M. FLETCHER, JR.
Attesting Officer

C. MARSHALL DANN
Commissioner of Patents